United States Patent [19]

Ebel et al.

[11] Patent Number: 5,114,811
[45] Date of Patent: May 19, 1992

[54] HIGH ENERGY DENSITY NON-AQUEOUS ELECTROLYTE LITHIUM CELL OPERATIONAL OVER A WIDE TEMPERATURE RANGE

[75] Inventors: Steven J. Ebel, Tonawanda; Michael F. Pyszczyk, Hamburg; Christine A. Frysz, East Amherst; Michael A. Zelinsky, Lancaster, all of N.Y.

[73] Assignee: W. Greatbatch Ltd., Clarence, N.Y.

[21] Appl. No.: 475,410

[22] Filed: Feb. 5, 1990

[51] Int. Cl.$^5$ ............................................. H01M 6/16
[52] U.S. Cl. .................................. 429/194; 429/184; 429/245
[58] Field of Search ........................ 429/194, 245, 184

[56] References Cited

U.S. PATENT DOCUMENTS

| | | |
|---|---|---|
| 3,301,711 | 1/1967 | King, Jr. et al. |
| 3,484,296 | 8/1967 | Buzzelli |
| 3,514,337 | 5/1970 | Braeuer et al. ............... 429/194 |
| 3,536,532 | 4/1969 | Watanabe et al. |
| 3,700,502 | 10/1972 | Watanabe et al. |
| 3,897,264 | 7/1975 | Auborn |
| 3,935,025 | 1/1976 | Cadman et al. ............... 429/194 |
| 3,947,289 | 3/1976 | Dey et al. ...................... 429/194 |
| 4,246,327 | 1/1981 | Skarstad et al. |
| 4,271,242 | 6/1981 | Toyoguchi et al. |
| 4,310,609 | 1/1982 | Liang et al. |
| 4,391,729 | 7/1983 | Liang et al. |
| 4,585,715 | 4/1986 | Marple .......................... 429/194 |
| 4,690,877 | 9/1987 | Gabano et al. ............... 429/194 |
| 4,803,137 | 2/1989 | Miyazaki et al. ............. 429/194 |
| 4,830,940 | 5/1989 | Keister et al. ................ 429/194 |

Primary Examiner—Stephen Kalafut
Attorney, Agent, or Firm—Hodgson, Russ, Andrews, Woods & Goodyear

[57] ABSTRACT

An electrochemical cell is provided having a metallic anode comprising a lithium-aluminum alloy, a solid cathode of electronically conductive material and an ionic conductive non-aqueous electrolyte solution operatively associated and in direct contact with the anode and cathode. The metallic anode comprises a lithium-aluminum alloy wherein aluminum comprises from about 0% to about 50% by weight of the alloy. The solid cathode comprises a fluorinated carbon such as poly carbon monofluoride, a metal oxide or a metal oxide bronze. The non-aqueous electrolyte solution comprises a first component consisting of a high boiling aprotic solvent or combinations thereof, and a second component consisting of at least one lithium salt. The electrochemical cell demonstrates an energy density of about 0.6WH/CC and exhibits consistent performance predictability over an operational range of from about −20° C. to about 180° C.

26 Claims, 5 Drawing Sheets

"X" ZINC/SILVER OXIDE CELL

"—" CELL OF PRESENT INVENTION

HIGH ENERGY DENSITY NON-AQUEOUS ELECTROLYTE LITHIUM CELL OPERATIONAL OVER A WIDE TEMPERATURE RANGE

FIELD OF THE INVENTION

This invention relates generally to the art of lithium batteries, and more particularly to a new and improved solid cathode, high boiling non-aqueous electrolyte lithium cell exhibiting characteristics of both a high energy density and consistent performance predictability over a wide temperature range.

BACKGROUND OF THE INVENTION

Industrial applications involving use of batteries in oil wells and exploration provide an environment where a wide range of temperatures may be encountered. For example, a rig in the North sea may require that the batteries give adequate performance on the surface, as well as providing the longevity of operation required "down hole" in the oil well's high temperature environment. In industrial applications such as the "down hole" pressure measurement market and other oil applications, a high energy density battery is preferred to optimize performance and should be operable over a temperature range of from about 0° C. to about 180° C. However, current power source technology heretofore available does not offer a high energy density battery consistently operable over the wide temperature range.

It has been reported that with some high temperature batteries, the oil rig operators are forced to heat the tool containing the batteries on the surface prior to going "down hole". This tends to be a burdensome process and potentially dangerous since the batteries can explode. Further, surface heating generally eliminates surface testing of the equipment prior to placement in the hole.

Several batteries are currently available which claim high temperature performance. One such commercially available cell used in high temperature industrial applications today is the zinc silver oxide battery. The zinc silver oxide cell exhibits a good operating temperature range from about room temperature to approximately 180° C. However, the cell is of low energy density as compared to lithium and delivers only about 1 to 1½ volts. Consequently, those using this cell in the industry incur high costs in terms of the number of cells required in the battery and increased space requirements for these large number of cells.

Other batteries designed for use in high temperature (over 150° C.) industrial applications include the lithium/oxyhalide batteries and the lithium/copper oxyphosphate battery. However, these batteries may be of limited use since they work well at high temperatures but may not work well at low temperatures (25° C. and lower) as does the cell of the present invention.

Conventional lithium batteries such as those disclosed in U.S. Pat. Nos. 3,536,532, 3,700,502 and 4,271,242 are operable up to about 150° C. and at higher temperatures are unstable because of excessive internal pressure generation. Alkaline batteries are generally utilized in applications having operational temperature ranges of about 100°-110° C. However, at elevated temperature levels such as 180° C. alkaline batteries are inoperative.

Therefore, a high energy density battery of consistent performance predictability over a wide temperature range is needed for industrial applications.

SUMMARY AND OBJECTS OF THE INVENTION

The primary object of the present invention is to provide an electrochemical cell of high energy density and consistent performance predictability over a wide temperature range.

Another object of the present invention is to provide such an electrochemical cell for industrial applications such as the "down hole" pressure measurement market.

Another object of the present invention is to provide such an electrochemical cell having an energy density for a "C" cell of from about 0.25 watt hrs/cc to about 0.6 watt hrs./cc and an open circuit voltage output of from about 3.0 volts to about 3.5 volts.

Another object of the present invention is to provide such an electrochemical cell exhibiting consistent performance predictability over an operational temperature range of from about −20° C. to about 180° C.

The electrochemical cell of the present invention exhibits a high energy density for a "C" cell of from about 0.25 watt hrs./cc to about 0.6 watt hrs./cc and an open circuit voltage output of about 3.0 volts to about 3.5 volts. The electrochemical cell further exhibits consistent performance predictability over an operational temperature range of from about −20° C. to about 180° C.

An electrochemical cell is provided having a metallic anode comprising a Group IA, IIA or IIIB element or alloy thereof, a solid cathode of electronically conductive material and an ionicaly conductive non-aqueous electrolyte solution operatively associated and in direct contact with the anode and cathode. More preferably, the metallic anode comprises a lithium-aluminum alloy wherein aluminum comprises from about 0% to about 50% by weight of the alloy. The solid cathode comprises a fluorinated carbon such as polycarbon monofluoride ($CF_x$) wherein x ranges from 0.5 to 1.2, a metal oxide or a metal oxide bronze such as silver vanadium oxide. The non-aqueous electrolyte solution comprises a first component consisting of a high boiling aprotic solvent or combinations thereof, and a second component consisting of at least one lithium salt. Optionally, a secondary salt containing perchlorate anion may be present in the aqueous electrolyte solution.

DETAILED DESCRIPTION OF THE INVENTION

The term "energy density" as used herein, refers to the energy density of a "C" cell to 2 V under nominal load depending on temperature use. The cell of the present invention demonstrates an energy density of from about 0.25 watt hrs./cc to about 0.6 watt hrs./cc to 2 V under a nominal load of from about 3 ohm to 1K ohm and at a temperature of from about $-20°$ C. to $180°$ C.

The cell of the present invention exhibits consistent predictability performance over an operational temperature range of from about $-20°$ C. to about $180°$ C. with an operating life at $180°$ C. of about eighteen days. The cell provides an open circuit voltage output of from about 3.0 volts to about 3.5 volts. Other characteristics for a "C size" cell of the present invention include stability at temperatures as high as $200°$ C., nominal current capacity of 4.0 Ah, a continuous discharge rate to 250 mA, and an estimate self discharge rate of less than 2% per year. The cell will not rupture or leak when subjected to short circuit at room temperature.

The cell of the present invention comprises an anode selected from group IA, IIA or IIIB metals, and their alloys. The preferred anode comprises lithium, and the more preferred anode comprises a lithium alloy, the preferred lithium alloy being lithium aluminum. The aluminum comprises from about 0% to about 50% by weight of the alloy. The greater the amount of aluminum present by weight in the alloy the lower the energy density of the cell. The form of the anode may vary, but preferably is a thin metal sheet or foil of the anode metal, pressed or rolled on a metallic anode current collector to form an anode strip. In the cell of the present invention, the anode strip has an extended tab or lead of the same material as the current collector or integrally formed therewith welded to the current collector and contacted by weld to a cell case of conductive metal in a case-negative electrical configuration. Alternatively, the anode may be formed in some other geometry, such as a bobbin shape, cylinder or pellet to allow an alternate low surface area cell design.

The cell of the present invention further comprises a solid cathode of an electronically conductive composite material which serves as the other electrode of the cell. The solid cathode material may comprise a fluorinated carbon, a metal oxide or metal oxide bronze. The solid cathode exhibits excellent thermal stability and is generally safer and less reactive than a non-solid cathode. In one aspect thereof, the solid cathode material preferably comprises a fluorinated carbon, and more preferably comprises polycarbon monofluoride ($CF_x$), a conductive agent such as a carbon black or graphite, and a binder such as polytetrafluoroethylene (PTFE). Polycarbon monofluoride ($CF_x$) is preferably present in an amount wherein "x" is in the range of from about 0.5 to about 1.2, and most preferably about 1. For a more detailed description of this as well as alternative fluorinated carbon materials reference is made to U.S. Pat. Nos. 3,536,532, 3,700,502 and 4,271,242, the disclosures of which are hereby incorporated by reference.

In another aspect thereof, the solid cathode material may comprise a metal oxide bronze. The cathode material can be constructed by the chemical addition, reaction or otherwise intimate contact of various metal oxides and/or metal elements during thermo treatment in mixed states. Alternatively, the cathode material may be the product of a thermo treatment of a single metal oxide. The materials thereby produced contain metals and oxides of the Group IB, IIB, IIB, IVB, VB, VIB, VIIB and VIIIB which includes the noble metals and/or their oxide compounds. Decomposable compounds consisting of metals from Groups IB, IIB, IIIB, IVB, VB, VIB and VIIB as well as similarly decomposable compounds from Group VIIIB are thermally treated so as to effect the rapid preparation of the oxides or the respective metal elements themselves to be utilized further in the preparation of suitable cathode materials. Such readily decomposable materials include, but are not limited to, those classes of compounds known as nitrates, nitrites, carbonates and/or ammonium salts. These precursor materials may be decomposed in a combined state or individually decomposed and thereafter combined in an oxide-decomposable metal salt compound and subsequently decomposed to form the cathode composite matrix. For a more detailed description of the metal oxide bronze cathode material, reference is made to U.S. Pat. No. 4,391,729, the disclosure of which is hereby incorporated by reference.

In still a further aspect thereof, the solid cathode material may comprise a metal oxide. For a detailed description of metal oxides for use as the cathode material in the cell of the present invention, reference is made to U.S. Pat. No. 3,945,848 which discloses the use of cobalt (III) oxide, U.S. Pat. No. 4,158,722 which discloses the use of chromium oxide and U.S. Pat. No. 3,423,242 which discloses the use of vanadium pentoxide, the disclosures of which are hereby incorporated by reference.

Figure 1:
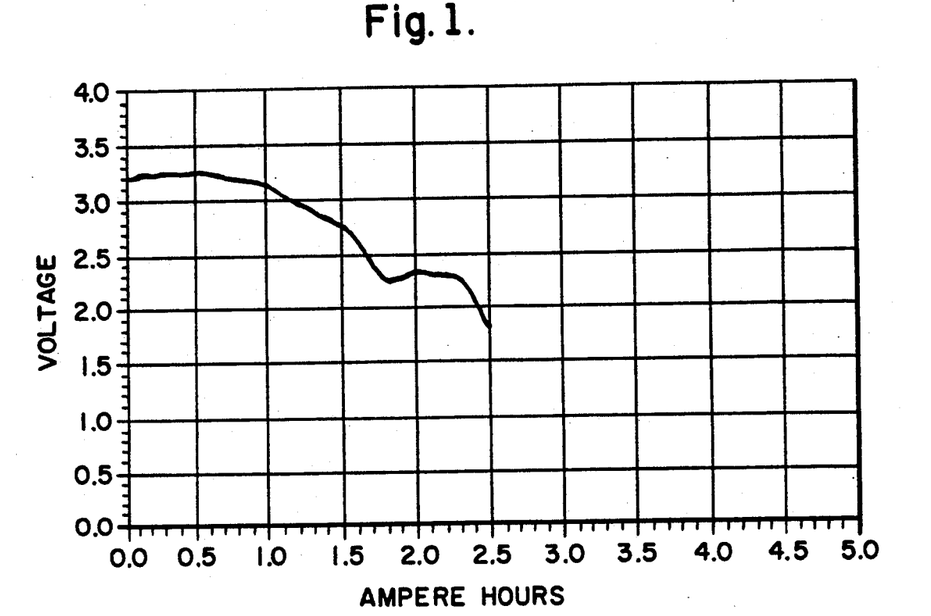
FIG. 1 discloses a graph showing discharge at 180° C. under 301 ohm load of the cell of the present invention having a graphite coating baked on a titanium current collector at a temperature of 300° C.
Figure 2:
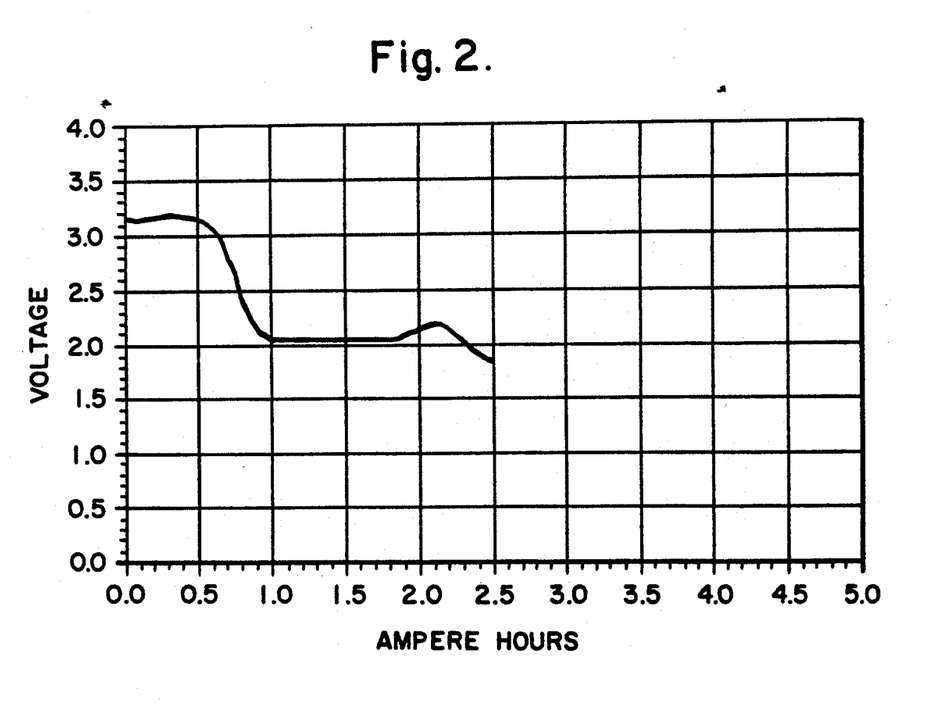
FIG. 2 discloses a graph showing discharge at 180° C. under 301 ohm load of the cell of the present invention having a graphite coating baked on a titanium current collector at a temperature of 150° C.

The cathode current collector grid is of a corrosion resistant material and includes chemically pure titanium (grades 1-4), austenitic stainless steels such as 304, 316 and REMANIT 4465, and the class of highly alloyed ferritic stainless steels such as 30-2 SHOMAC, ALLEGHENY-LUDLUM 29-4-2 and 29-4-C, and SUPERFERRIT (REMANIT 4575). The metallic grid may or may not be annealed. The cathode current collector formed from a grade of chemically pure titanium should be coated with a conductive graphite such as ACHESON ELECTRODAG 158. Current coating technology provides for baking the graphite coating on the current collector at temperatures of around $150°$ C. With reference to FIGS. 1 and 2 it was discovered that baking the graphite coating on the titanium current collector at a temperature of about $300°$ C. increased the longevity of discharge service of the cell while still providing an effective passivation barrier having enough conductivity. FIG. 1 shows a typical discharge curve which represents the cell of the present invention having the graphite baked on the titanium current collector at $300°$ C. FIG. 2 shows a typical discharge curve which represents the cell of the present invention having the graphite baked on the titanium current collector at $150°$ C. Thereafter, the cells shown in FIGS. 1 and 2 were discharged at $180°$ C. under a 301 ohm load. If the coating is baked at a temperature of $300°$ C. as opposed to 150° C. reduced corrosion is noted resulting in a more stable cell having better performance. It was concluded that when the graphite coating is baked on the titanium current collector at a temperature of 200° C. or lower the effect will be decreased cell performance.

Figure 3:
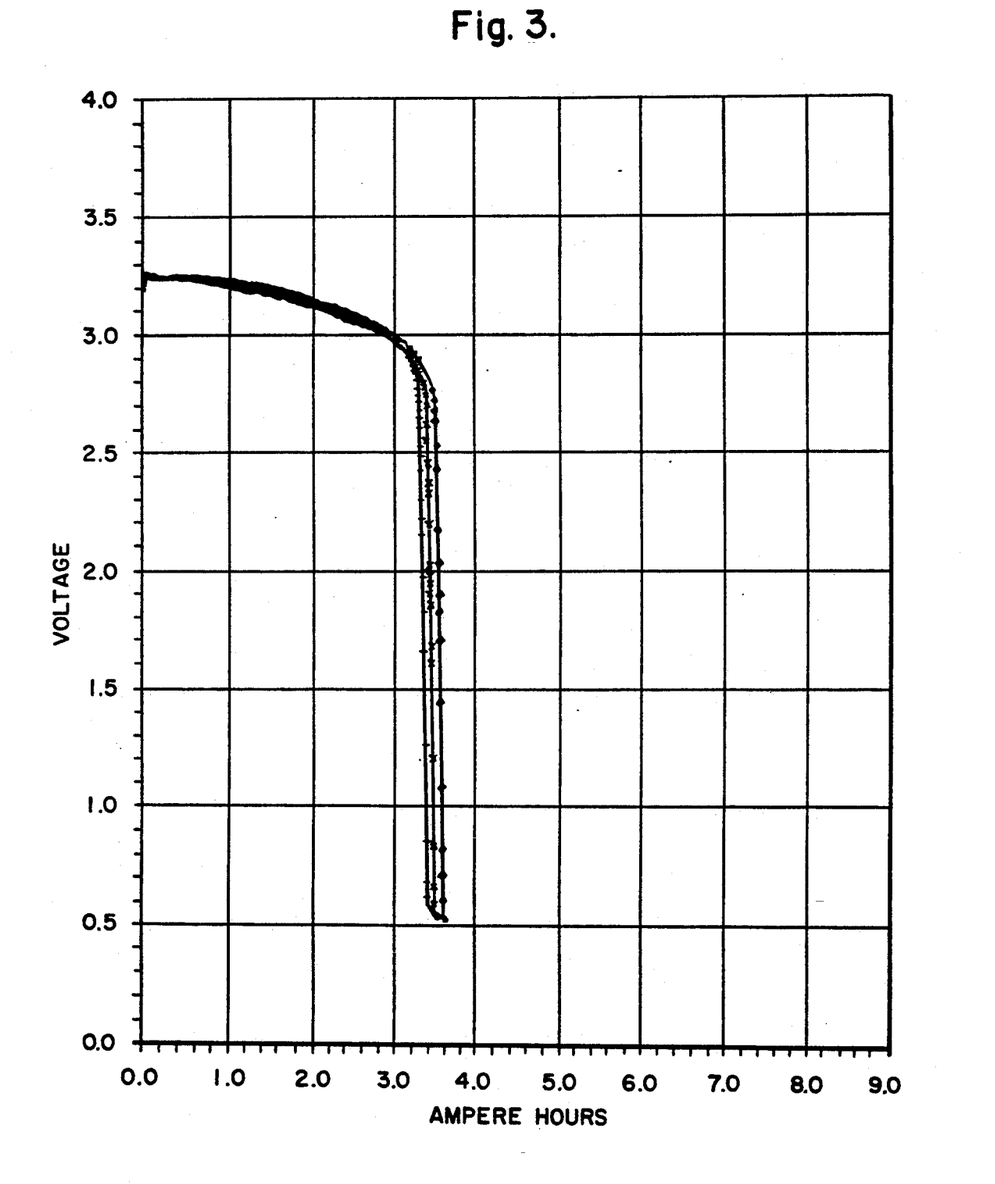
FIG. 3 discloses a graph showing discharge at 180° C. under 301 ohm load of the cell of the present invention having a cathode current collector comprised of the highly alloyed ferritic stainless steel material SUPERFERRIT.
Figure 4:
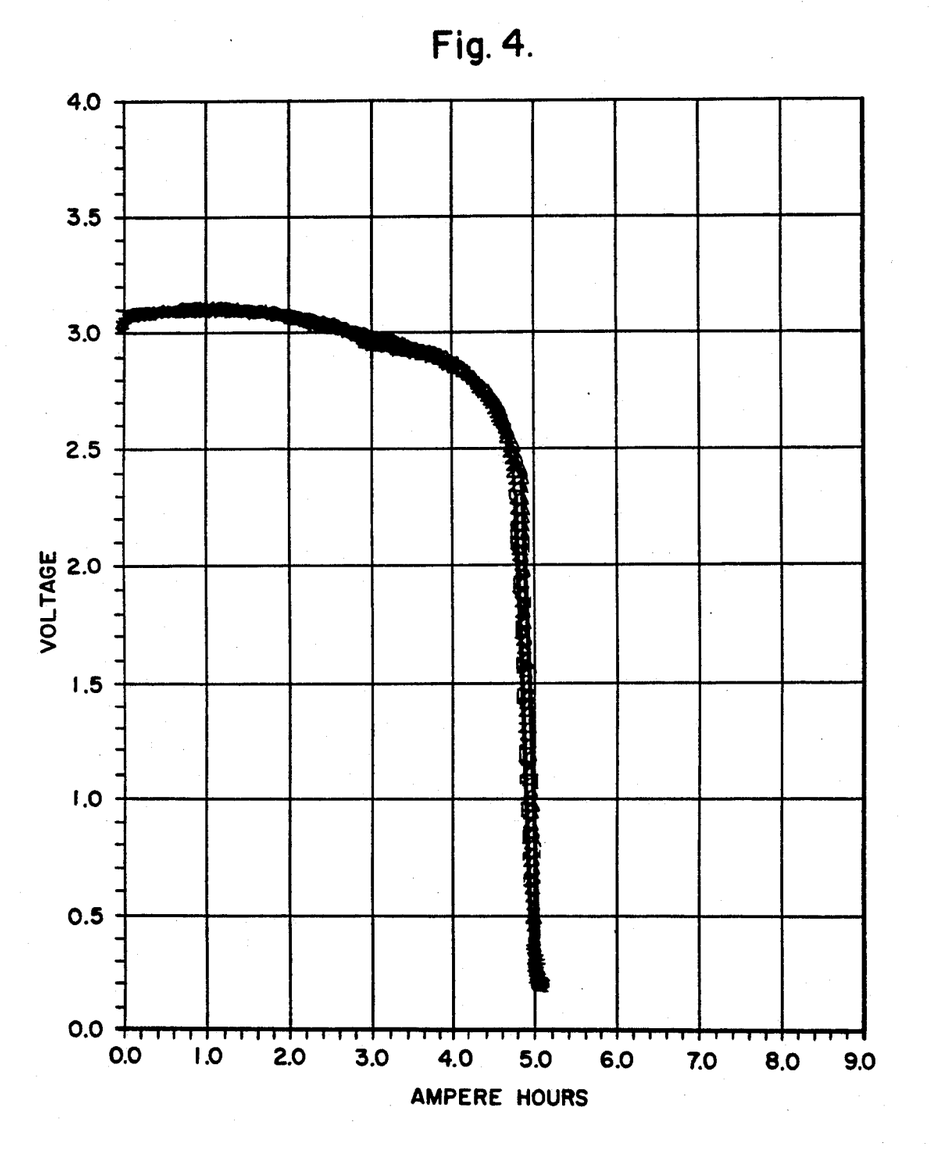
FIG. 4 discloses a graph showing discharge at 180° C. under 56 ohm load of the cell of the present invention having a cathode current collector comprised of the highly alloyed ferritic stainless steel material SUPPERFERRIT.

The more preferred cathode current collector for use in accordance with the cell of the present invention comprises one of the class of highly alloyed ferritic stainless steels. With reference to FIGS. 3 and 4, there is shown discharge curves at 180° C. and 301 ohm and 560 ohm loads, respectively, showing the performance of a cell of the present invention using SUPERFERRIT material as the cathode current collector. Of course, the self discharge competes with the cell capacity and is dependent on load and time. It has been discovered that this cell using the SUPERFERRIT cathode current collector exhibits better cell performance than the cell using the titanium cathode current collector having the graphite baked thereon as shown in FIGS. 1 and 2. Using highly alloyed ferritic stainless steels has never been applied to batteries operational at high temperatures over 100° C.

Furthermore, it was found that a cathode current collector comprising a highly alloyed ferritic stainless steel does not need a graphite coating as described above for use at high temperatures. The cathode current collector used in the cell of the present invention may be fabricated by any of the following techniques: mechanical expansion; chemical machining, etching or milling; electrolytic etching; woven fabric; perforation or foil with vapor deposited bonding layer. In the cell, the cathode current collector is in contact with the positive terminal pin via a lead of the same material as the current collector which is welded to both the current collector and the positive terminal pin for electrical contact. For a more detailed description of the highly alloyed ferritic stainless steel cathode current collector refer to related U.S. Pat. application Ser. No. 07/475,261, filed Feb. 5, 1990.

The cell of the present invention further comprises a high boiling non-aqueous electrolyte solution operatively associated with the anode and the cathode. The preferred non-aqueous electrolyte comprises single high boiling aprotic solvents, or combinations thereof, including (gamma)-butyrolactone, propylene carbonate, diglyme, tetraglyme, dimethyl sulfite, dimethyl sulfoxide, sulfolane, (gamma)-valerolactone and ethylene carbonate. Most preferably, the non-aqueous electrolyte comprises (gamma)-butyrolactone.

Additionally, the non-aqueous electrolyte solution comprises a lithium salt with a suitably stable anion. Such lithium salts include lithium tetrafluoroborate, lithium hexafluoroarsenate, lithium trifluoromethane sulfonate, hexafluorophosphate and lithium perchlorate alone or in combination with an optional secondary salt containing the perchlorate anion such as lithium perchlorate and tetrabutyl ammonium perchlorate. The most preferred lithium salt is lithium tetrafluoroborate. The purpose of the perchlorate secondary salt is to change the corrosion characteristics of the cathode polarity metallic components, such as the current collector and cathode lead, thereby increasing discharge longevity to over two weeks at high temperatures such as 180° C.

When the mechanical structure or configuration of the cell requires, a separator can be employed to provide physical separation between the anode and the cathode current collectors. The separator is of electrically insulative material to prevent an internal electrical short circuit in the cell between the anode and the cathode current collectors. The separator material also must be chemically unreactive with both the materials of the anode and the cathode current collectors and the non-aqueous electrolyte solution. In addition, the separator material must have a degree of porosity sufficient to allow flow therethrough of the electrolyte solution during the electrochemical reaction of the cell. Examples of separator materials include nonwoven glass, porous TEFLON, glass fiber material, ceramics and materials commercially available under the trademarks ZITEX (Chemplast Inc.), CELLGARD (Celanese Plastic Co. Inc.) and DEXIGLAS (C. H. Dexter Div. Dexter Corp.). The form of the separator typically is a sheet which is placed between the anode and cathode of the cell in a manner preventing physical contact between the anode and cathode, and such contact is prevented when the combination is rolled or otherwise formed into a cylindrical configuration.

The assembly of the cell described herein is preferably in the form of a wound element cell. That is, the fabricated cathode, anode and separator are wound together in a "jelly roll" end type configuration or "wound element cell stack" such that the anode is on the outside of the roll to make electrical contact with the cell case. Using suitable top and bottom insulators, the wound cell stack is inserted into a metallic case of a suitable size dimension. The metallic case may be comprised of materials such as stainless steel, mild steel, nickel-plated mild steel, titanium or aluminum, but not limited thereto so long as the metallic material is compatible for use with the components of the cell. The cell header comprises a metallic disc-shaped body with a first hole to accommodate a glass to metal seal/terminal pin feedthrough and a hole for electrolyte filling. The glass used is of a corrosion resistant type having from about 0% to about 50% by weight silicon such as CABAL 12, TA 23 or FUSITE 425 or 435. The positive terminal pin feedthrough preferably comprises molybdenum, titanium, nickel alloy, or stainless steel material. The cell header comprises elements having compatibility with the other components of lithium batteries and is for resistance to corrosion. The cathode lead is welded to the positive terminal pin in the glass to metal seal. The header is welded to the case containing the electrode stack. The cell is thereafter filled with the electrolyte solution described hereinabove and hermetically sealed such as by close-welding a stainless steel ball over the fill hole, but not limited thereto. This above assembly describes a case negative cell which is the preferred construction of the cell of the present invention.

The electrochemical cell disclosed herein operates in the following manner. When the ionic conductive electrolyte solution becomes operatively associated with the anode and cathode of the cell, an electrical potential difference is developed between terminals operatively connected to the anode and cathode. The electrochemical reaction of the anode includes oxidation to form metal ions during discharge of the cell. The electrochemical reaction of the cathode involves conversion of ions which migrate from the anode to the cathode into reduced molecular forms.

The cell is provided with a fuse to insure cell safety under excessive discharge rates or inadvertent short circuit. A temperature safety margin of up to 200° C. has been tested without incident. The cell of the present invention exhibits a high energy density and consistent performance predictability over a wide temperature range, and this will become more apparent with reference to the following examples.

EXAMPLE I

C size dimension cells having a case height of 1.77 inches and inside diameter of 0.957 inches were constructed. The cathode material weighed 8.0 grams and comprised, by total weight percent, 87% polycarbon monofluoride, 8% carbon black and 5% PTFE. The cathode was fabricated by sheeting the material on a SUPERFERRIT cathode current collector to form a flexible cathode strip 4.0 inches in length and 1.5 inches in width. The anode material weighed 1.51 grams and comprised, by total weight percent, 85% lithium and 15% aluminum. The lithium aluminum alloy was pressed on a nickel anode current collector to form an anode strip by sandwiching the anode current collector between two pieces of lithium aluminum alloy, one piece 5.25 inches and the second piece 2.5 inches in length and 1.30 inches in width, with a lead welded thereto. Separator material, KAOWOOL glass mat paper, of 0.02 inches in thickness was cut to dimensions of 11.25 inches in length and 1.63 inches in width and was placed between the anode and cathode. Thereafter the anode, cathode and separator were rolled together into a wound element cell stack wherein the anode material was on the outside of the cell to make electrical contact with the cell case. Using top and bottom insulators of FEP TEFLON and top and bottom pads of KAO-WOOL (0.02") the cell stack was inserted into a stainless steel case of C size dimensions as noted above. The cathode lead is fed through the top insulator and pad so as to make contact with the terminal pin. The cell header comprised a stainless steel disc shaped body with a hole to accomodate the glass to metal seal terminal pin feedthrough and a hole for electrolyte filling. The FUSITE 435 glass used was of a corrosion resistant type. The positive terminal pin feedthrough comprised E-BRITE stainless steel. The cathode lead was welded to the positive terminal pin in the glass to metal seal. The header was welded to the case containing the wound element cell stack. An amount of 12.0 grams of the electrolyte solution comprising one molar lithium tetra- floroborate (LiBF$_4$) in gamma butyrolactone was added to each of the cells. The cells were then hermetically sealed by close-welding a stainless steel ball over the fill hole.

The cells have a nominal capacity of 4.5 AH and an open circuit potential of about 3.2 to about 3.6 volts. The cell has demonstrated energy density of 0.28 wh/g (0.6 wh/cc) at 180° C.

EXAMPLE II

Figure 5:
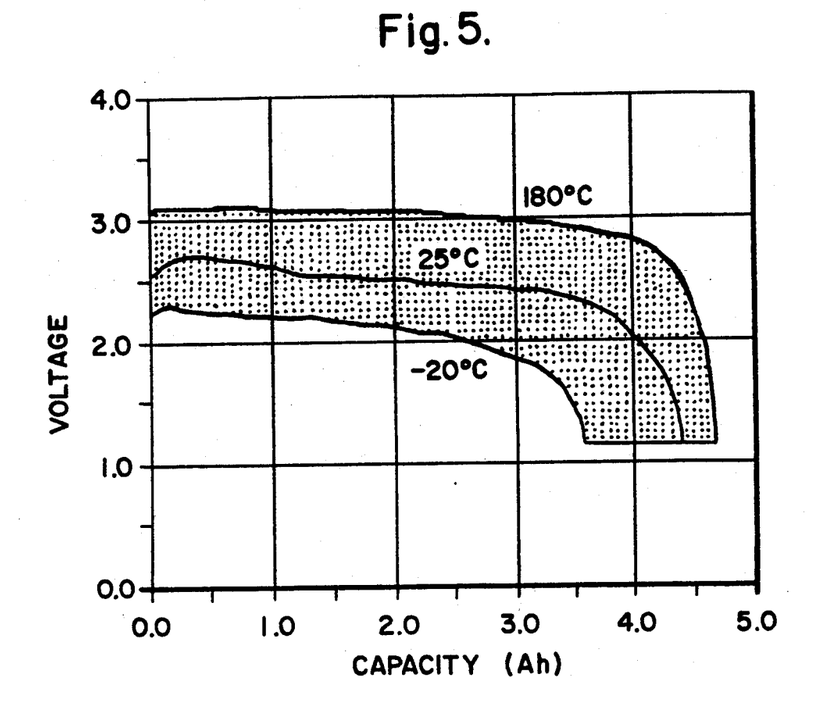
FIG. 5 discloses a graph showing discharge of the cell of the present invention as a function of temperature.
Figure 6:
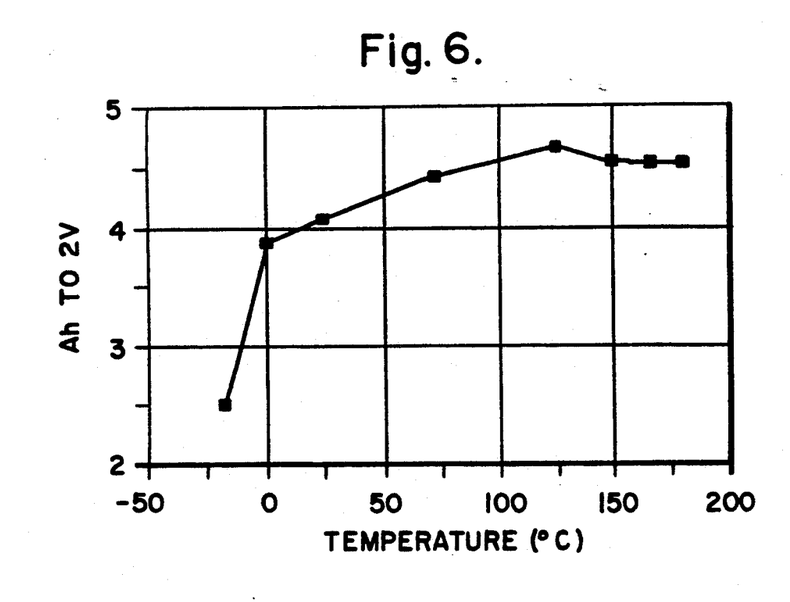
FIG. 6 discloses a graph showing discharge of the cell of the present invention by capacity versus temperature characteristics.

A cell was prepared as in Example 1 and the discharge behavior was observed. The discharge behavior is represented by the discharge curve shown in FIG. 5 as a function of temperature, and by the capacity versus temperature characteristics curve shown in FIG. 6. It is observed that to a 2 V cutoff under a 56 ohm load, more than half of the maximum achievable capacity is still available at temperatures as low as −20° C.

EXAMPLE III

Figure 7:
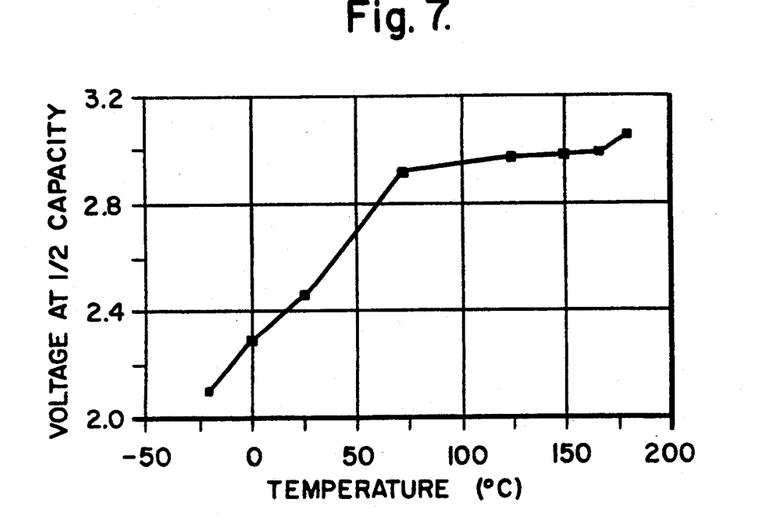
FIG. 7 discloses a graph showing the running voltage versus the test temperature characteristic curve of the cell of the present invention.

A cell was prepared as in Example 1 and the 56 ohm running voltage, i.e. the voltage at ½ capacity, versus test temperature was observed. The characteristic curve is shown in FIG. 7.

EXAMPLE IV

Figure 8:
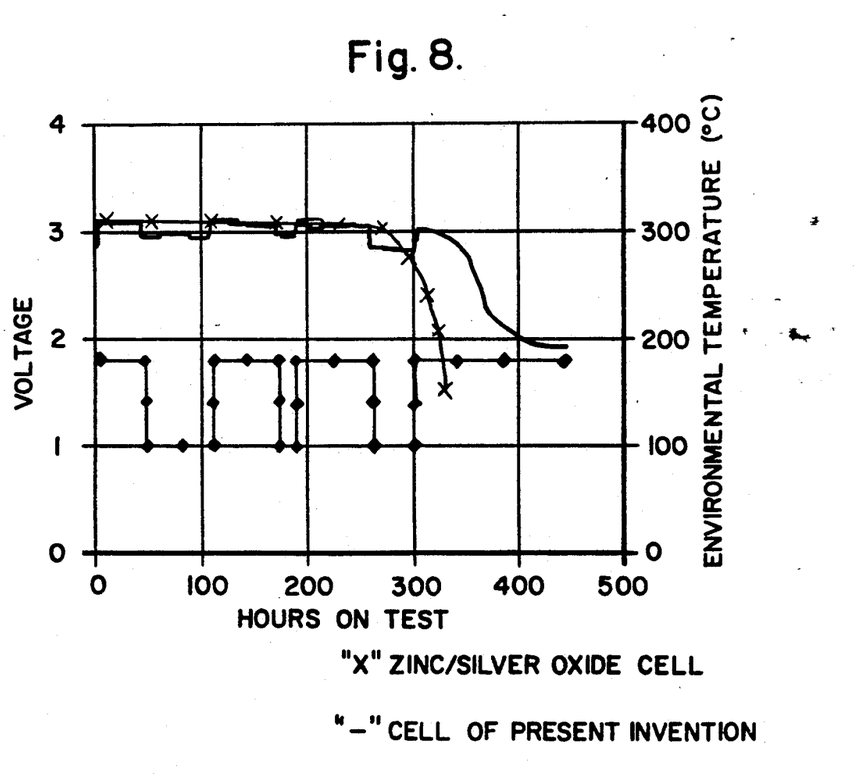
FIG. 8 discloses a graph showing the longevity of operation of two zinc/silver oxide C cells connected in series to a single cell of the present invention.

A single cell was prepared as in Example 1, except that the cathode current collector was comprised of titanium. This cell was compared to two Zn/Ag$_2$O "C" cells connected in series which are commercially available and used in "down hole applications" under a discharge regime which was as close to a realistic worst case as possible under laboratory conditions. The cells were discharged at low rates (301 ohm loads, or approximately 10 mA) while being randomly cycled between 100° C. and 180° C. which represents a typical range of temperatures for "downhole" applications. FIG. 8 shows that a series of two Zn/Ag$_2$O cells cannot match the performance of a single cell of the present invention in longevity of operation. Accordingly, the cell of the present invention is a significant improvement over the Zn/Ag$_2$O cell. It is noted that a cell prepared as described above except using a highly alloyed ferritic stainless steel as the cathode current collector material should exhibit still better performance than the cell using titanium as the cathode current collector.

We Claim:

1. An electrochemical primary cell for delivering power at a relatively high rate and having a metallic anode comprising a Group IA, IIA or IIIB element or alloy thereof and a solid cathode of electronically conductive material and characterized by an ionic conductive non-aqueous electrolyte solution operatively associated and in direct contact with said anode and said cathode, said non-aqueous electrolyte solution comprising a first component consisting of a high boiling aprotic solvent, or combinations thereof, selected to provide a stable, high temperature electrolyte, and a second component consisting of at least one lithium salt, a cathode current collector of non-corroding ferritic stainless steel and an hermetic enclosure for said cell including a metal casing and glass-to-metal seal on the electrical feed-through, said cell demonstrating an energy density of up to about 0.6 watt hrs./cc and exhibiting consistent performance predictability over an operational temperature range of from about −20° C. to about 180° C.

2. The cell of claim 1, wherein said anode is a lithium aluminum alloy.

3. The cell of claim 2, wherein said lithium aluminum alloy comprises from about 0% to about 50% aluminum by weight.

4. The cell of claim 1, wherein said solid cathode is a fluorinated carbon.

5. The cell of claim 4, wherein the fluorinated carbon is polycarbon monofluoride (CF$_x$) wherein x ranges from 0.5 to about 1.2.

6. The cell of claim 1, wherein said solid cathode is a metal oxide.

7. The cell of claim 1, wherein said solid cathode is a metal oxide bronze.

8. The cell of claim 7, wherein the metal oxide bronze is silver vanadium oxide.

9. The cell of claim 1, wherein the cathode further comprises a suitable binder material.

10. The cell of claim 9, wherein the binder material is polytetrafluoroethylene.

11. The cell of claim 1, wherein said cathode current collector is comprised of one of the class of highly alloyed ferritic stainless steels.

12. The cell of claim 11, wherein said highly alloyed ferritic stainless steel is SUPERFERRIT.

13. The cell of claim 1, wherein said high boiling aprotic solvent is selected from the group consisting of (gamma)-butyrolactone, propylene carbonate, diglyme, tetraglyme, dimethyl sulfite, dimethyl sulfoxide, sulfolane, (gamma)-valerolactone, ethylene carbonate and combinations thereof.

14. The cell of claim 13, wherein said high boiling aprotic solvent is (gamma)-butyrolactone.

15. The cell of claim 1, wherein said lithium salt is selected from the group consisting of lithium tetrafluoroborate, lithium hexafluoroarsenate, lithium trifluoromethane sulfonate, lithium hexafluorophosphate and lithium perchlorate.

16. The cell of claim 1, wherein said electrolyte solution further comprises a salt containing the perchlorate anion.

17. The cell of claim 16, wherein said salt is selected from the group consisting of perchlorate, tetraalkyl ammonium perchlorate and lithium tetrafluoroborate.

18. The cell of claim 1, including a separator material between the anode and cathode current collectors.

19. The cell of claim 18, wherein said separator material is selected from the group consisting of KAOWOOL, glass fibers and porous fluoro polymers.

20. The cell of claim 1, wherein said cathode current collector is fabricated using a technique selected from the group consisting of mechanical expansion, chemical machining, etching or milling, electrolytic etching, woven fabric, perforation and foil with vapor deposited bonding layer.

21. The cell of claim 1, wherein said anode geometry includes a bobbin, cylinder, strip or pellet shape.

22. An electrochemical primary cell for delivering power at a relatively high rate having a metallic anode comprising a lithium-aluminum alloy and a solid cathode of electronically conductive material and characterized by an ionic conductive non-aqueous electrolyte solution operatively associataed and in direct contact with said anode and said cathode, said solid cathode comprising a fluorinated carbon, said non-aqueous electrolyte solution comprising a first component consisting of (gamma)-butyrolactone and a second component consisting of lithium tetrafluoroborate thereby providing a stable, high temperature electrolyte, said cell further comprising a cathode current collector of non-corroding ferritic stainless steel and an hermetic enclosure for said cell including a metal casing and glass-to-metal seal on the electrical feed-through, said cell demonstrating an energy density of about 0.6 WH/CC and exhibiting consistent operational performance over a temperature range of from about $-20°$ C. to about $180°$ C.

23. The cell of claim 22, wherein said electrolyte solution further comprises a salt containing the perchlorate anion.

24. The cell of claim 22, wherein said solid cathode is a fluorinated carbon.

25. The cell of claim 22, wherein the fluorinated carbon is poly carbon monofluoride $(CF_x)$ wherein x ranges from 0.5 to about 1.2.

26. The cell of claim 1, wherein said cell further includes a metallic anode current collector.

* * * * *

UNITED STATES PATENT AND TRADEMARK OFFICE
CERTIFICATE OF CORRECTION

PATENT NO. : 5,114,811

DATED : May 19, 1992

INVENTOR(S) : Steven J. Ebel, Michael F. Pyszczek, Christine A. Frysz, and Michael A. Zelinsky It is certified that error appears in the above—identified patent and that said Letters Patent is hereby corrected as shown below:

Title page, line 2 of heading [75] Inventors, change "Pyszczyk" to --Pyszczek--

Signed and Sealed this

Thirteenth Day of July, 1993

Attest:

MICHAEL K. KIRK

Attesting Officer

Acting Commissioner of Patents and Trademarks